Nov. 25, 1941.   S. D. VIGREN ET AL   2,264,058
SIGNALING HYDROMETER CIRCUIT CONTROLLER
Filed June 7, 1939     5 Sheets-Sheet 4
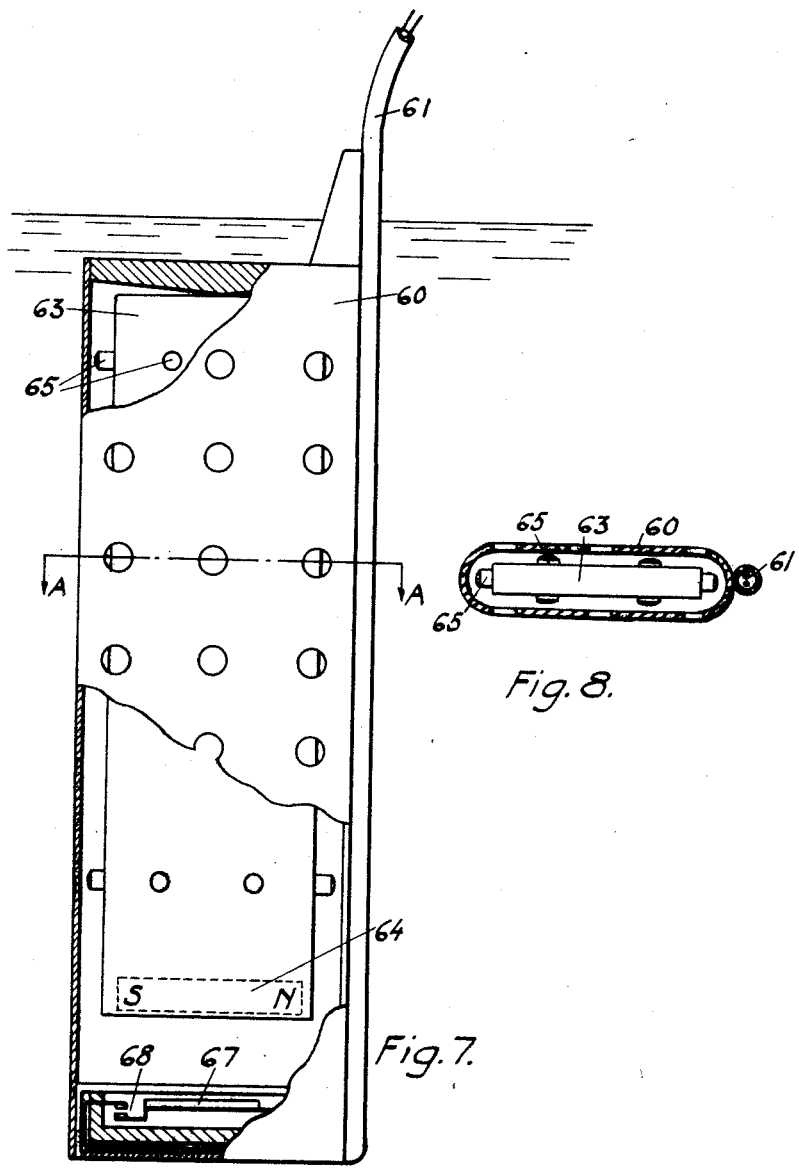
Sten Daniel Vigren
Nils E. B. Sterner
Gunnar Emanuel Ekström
INVENTORS
By
Their Att'y.

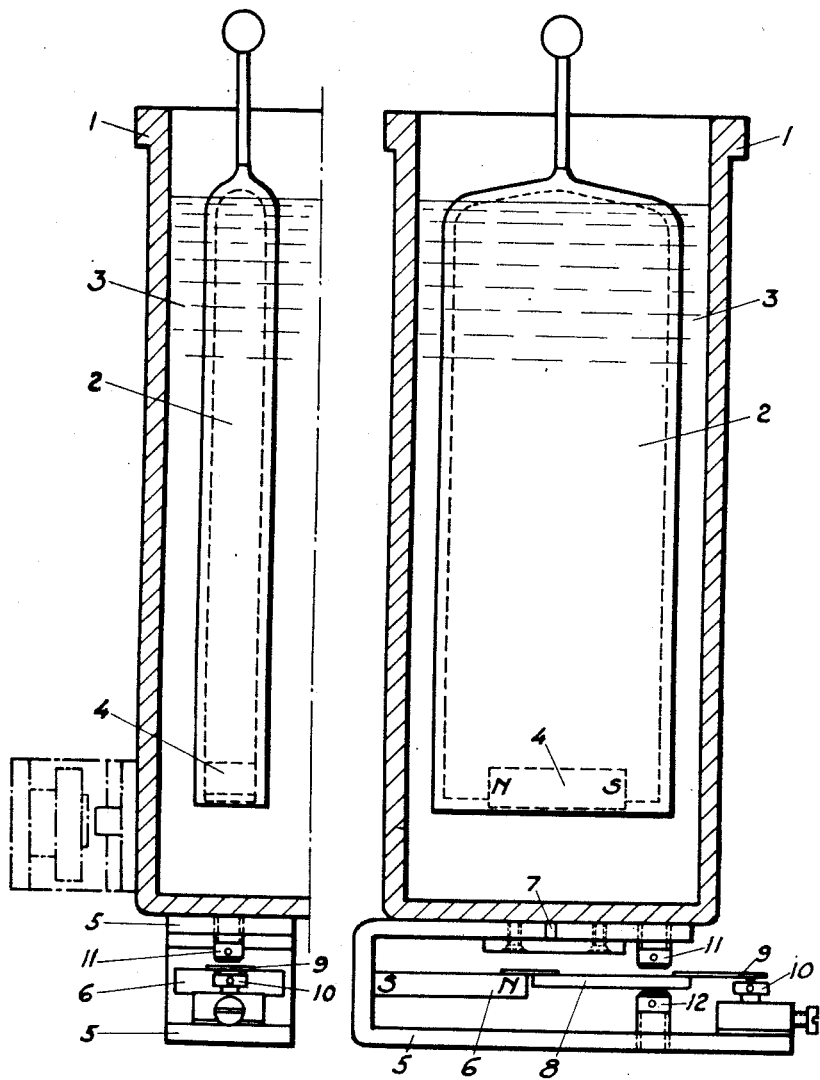

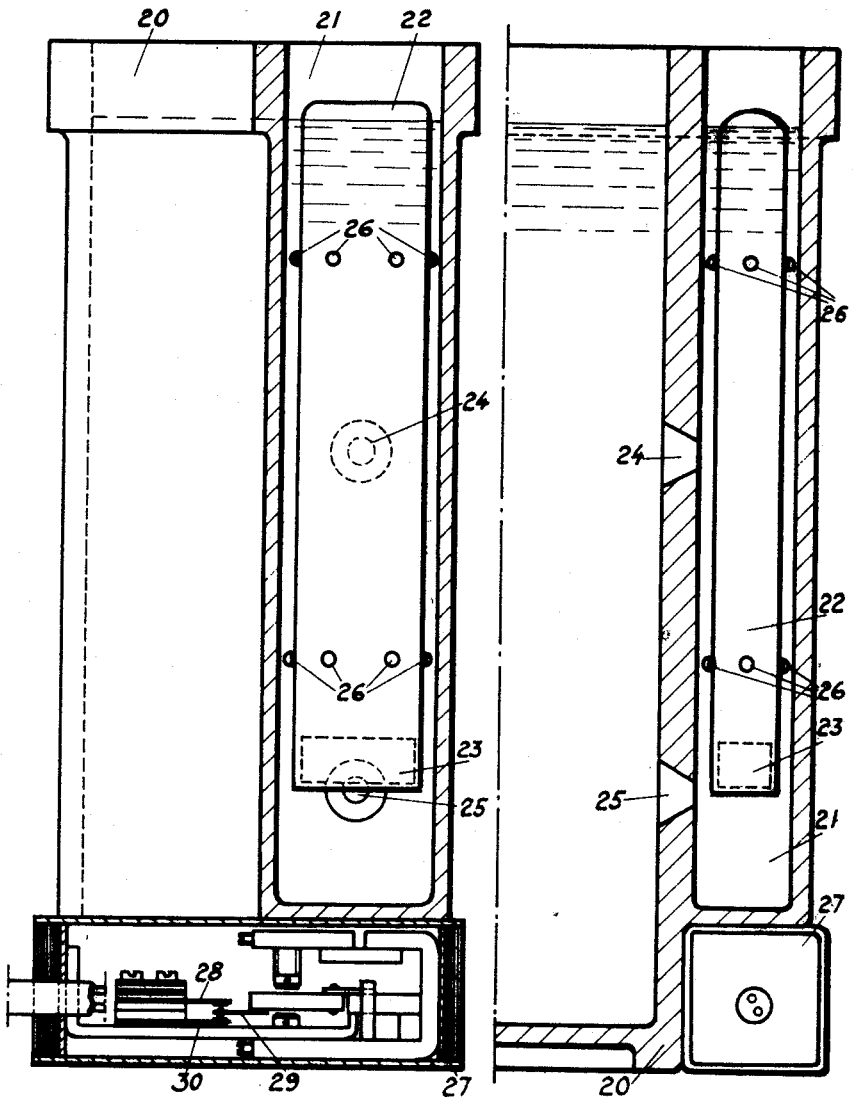

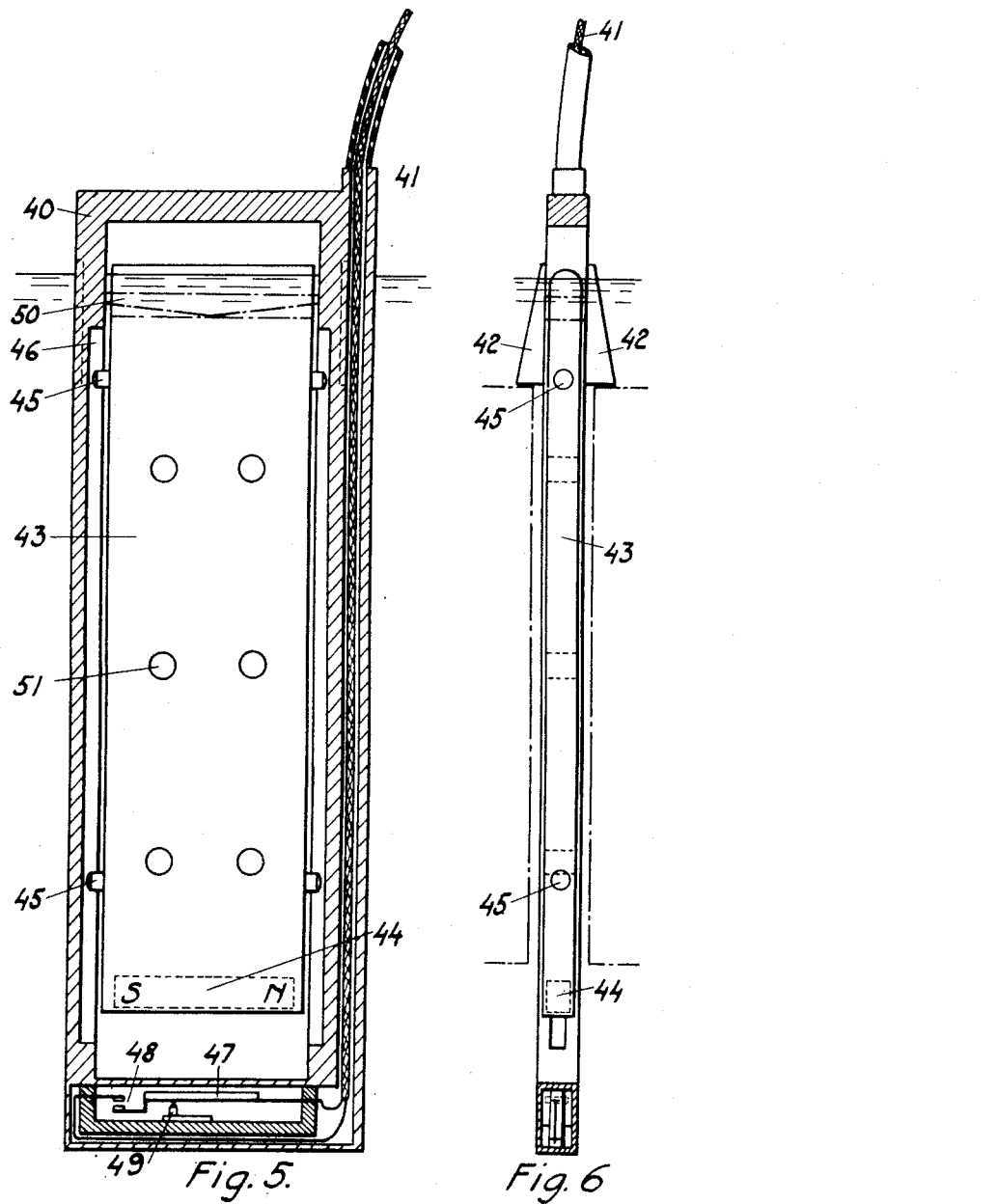

Patented Nov. 25, 1941

2,264,058

UNITED STATES PATENT OFFICE 2,264,058

SIGNALING HYDROMETER CIRCUIT CONTROLLER

Sten Daniel Vigren, Nils Erik Bertil Sterner, and Gunnar Emanuel Ekström, Stockholm, Sweden, assignors to Aktiebolaget Latex, Stockholm, Sweden, a joint-stock company of Sweden Application June 7, 1939, Serial No. 277,840
In Sweden June 13, 1938

15 Claims. (Cl. 200—84)

The present invention relates to arrangements for the remote control of the specific gravity of liquids and its main object is to provide a signaling hydrometer of a new, simple and reliable type.

The signaling hydrometer according to this invention has proved to be especially useful for the remote indication and control of the specific gravity of the electrolyte of a storage battery, in which the specific gravity of the electrolyte varies in known manner with the state of charge of the battery. In this case the object of the invention is to provide a signaling hydrometer, by means of which an indication, a signal or the like can be given, when the state of charge of the battery has reached or been lowered to a predetermined value.

Thus the signaling hydrometer according to this invention may be applied to storage batteries, having one or more cells and particularly to the remote control of the specific gravity of the acid, including the connection to or disconnection from a charging current source of one or more battery cells at a certain specific gravity of the electrolyte. In this manner the signaling hydrometer can serve for the control of an automatic charging arrangement for the battery, with or without an indicating device.

According to the desired results different methods can be used. One method comprises the starting of the charging current as soon as the acid of the storage battery upon discharge has reached a certain low specific gravity by means of a contact, operated by the hydrometer at this specific gravity. The charging current can then be interrupted again, when the specific gravity of the acid upon charge has been increased to another, higher value by means of another contact of the same hydrometer or by another hydrometer, operating at the last mentioned specific gravity.

But if the hydrometer according to this invention is not needed for the control of an automatic charging arrangement for a storage battery it is, however, particularly important with respect to batteries without daily supervision. As is well known, batteries of this kind must not be discharged or exhausted too much, and by means of a very simple signaling hydrometer according to this invention an alarm signal can be obtained, when, upon discharge, the specific gravity of the electrolyte has been lowered to a predetermined value.

As will be easily understood, the signaling hydrometer according to this invention may, however, be advantageously used in many other cases, a signal or the like being wanted at one or more predetermined values of the specific gravity of a liquid.

As is well known before, hydrometers for the control of the specific gravity of a liquid use the principle of a floating body, according to which principle the said body has a mass equal to the mass of the displaced liquid. Should the specific gravity of the liquid surrounding the hydrometer be changed, the hydrometer is either raised or lowered. And if the specific gravity of the liquid is gradually lowered the hydrometer finally ceases floating and sinks to the bottom of the vessel containing the liquid. If then the specific gravity of the liquid is gradually increased again, the hydrometer raises from the bottom and begins to float, raising more and more upon the increase of the specific gravity of the liquid.

According to this invention a hydrometer of the type, described above, is provided with a metal piece, for instance of a ferro-magnetic medium, preferably a permanent magnet. This hydrometer, carrying said metal piece is immersed in the liquid, the specific gravity of which is to be controlled. Thus the hydrometer and its metal piece will move up and down in the liquid in accordance with the variations of the specific gravity of the liquid. Further on there is provided an armature, consisting of a ferro-magnetic medium, by means of which one or more electric contacts are operable, and this armature is provided within or outside the vessel, containing the liquid to be controlled and the hydrometer, immersed in the same. Thus the hydrometer will make indicating movements in relation to said armature and if there is a magnetic field passing as well as the metal piece as said armature, the armature is operated in accordance with the variations of this field, viz. in accordance with the indicating movements of the hydrometer, viz. in accordance with the variations of the specific gravity of the liquid.

The magnetic field to be influenced by said metal piece, carried by the hydrometer, and to operate said armature can be produced in many known ways. If the metal piece of the hydrometer is a permanent magnet, the necessary magnetic field is produced by said magnet. But the armature may also form part of a so called polarised relay of a well known type, the magnetic field of which is influenced by the metal piece of the hydrometer in such a manner, that the armature is caused to operate.

Thus a signaling hydrometer according to this invention, provided for the remote control of the specific gravity of a liquid, comprises an armature, operable in accordance with the variation of a magnetic field, contact means, operable by said armature and adapted to be connected into electric circuits for the remote indication, and a hydrometer, immersed in said liquid and adapted to move up and down within said vessel and in relation to said armature on account of the variations of the specific gravity of said liquid, said hydrometer being provided with a metal piece, influencing said magnetic field upon said indicating movements of said hydrometer.

The invention will be further described and illustrated in connection with the accompanying drawings, in which—

Figs. 1 to 4 show two different forms of hydrometers immersed in a liquid, the specific gravity of which is to be controlled.

Figs. 5 to 10 show three other forms of signaling hydrometers according to this invention.

Figures 9, 10:
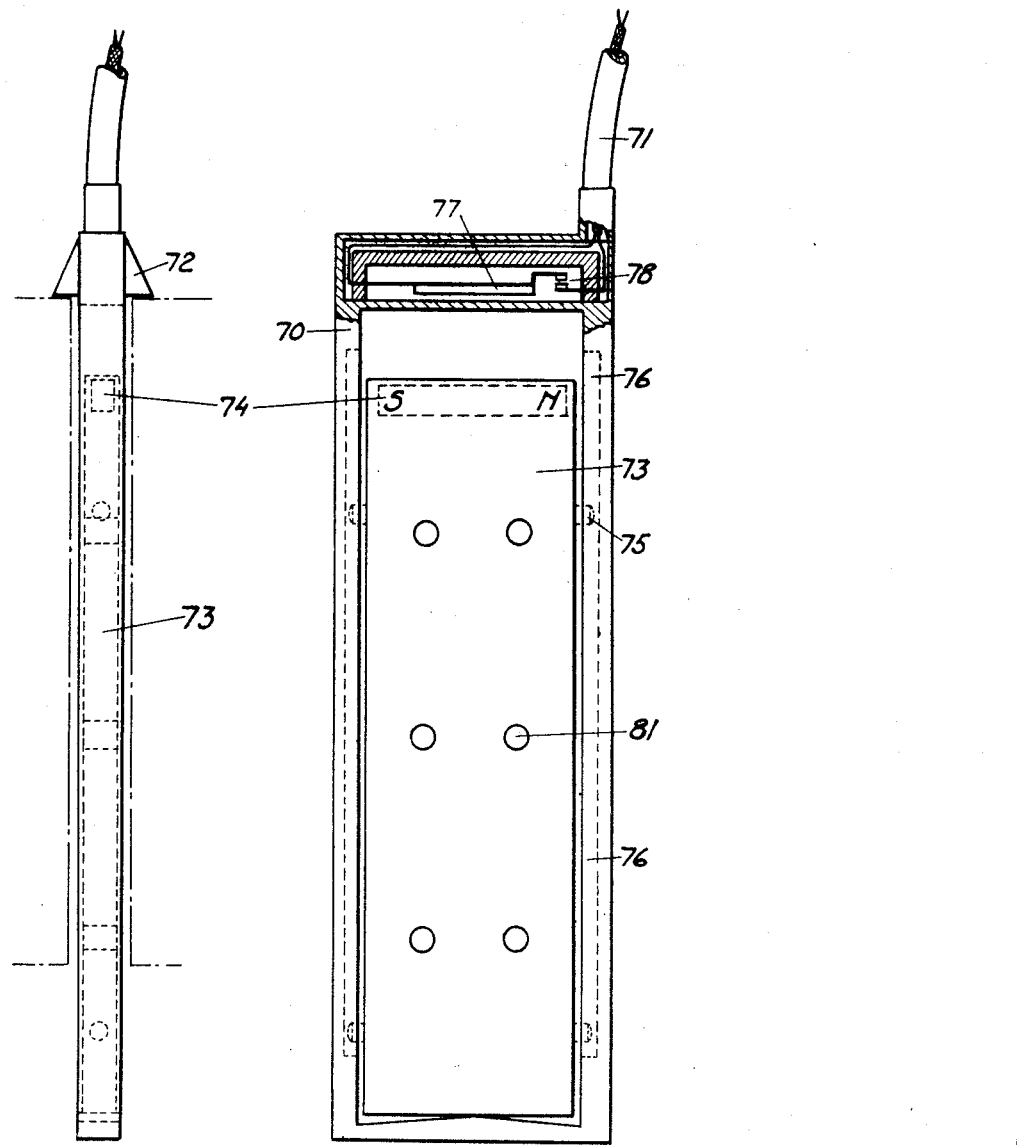

In Figs. 1 and 2 is shown a hydrometer 2 floating in the liquid 3 of the vessel 1. According to the invention the hydrometer is provided with a metal piece 4, which may be of magnetic material, for instance iron, and preferably consists of a permanent magnet, the poles of which are signed N and S respectively. The hydrometer may be of glass, any suitable plastic or the like.

Under the bottom of the vessel 1, or eventually at the side wall of the vessel, as shown in Fig. 1, is provided a so called polarised relay, comprising a frame 5, a permanent magnet 6 with the poles S and N, a movable armature 8, carrying contact means 9, the latter cooperating with a fixed and adjustable contact 10. In the upper part of the frame 5 is provided an air space 7 and the operation of the armature 8 is adjustable by means of the pole pieces 11 and 12. Instead of the permanent magnet 6 the relay can, of course, be provided with an electromagnet of known type.

The volume and mass of the hydrometer are so dimensioned in relation to the specific gravity of the liquid 3 that upon the lowering of the specific gravity of the liquid the hydrometer sinks to the bottom of the vessel at a predetermined value of the specific gravity. If, for example, the liquid 3 is the electrolyte of a lead accumulator, the hydrometer may easily be dimensioned to sink to the bottom of the vessel upon the lowering of the specific gravity to a certain, predetermined value, corresponding to the lowest allowable state of charge of the battery. If then the battery is discharged too much the hydrometer 2 sinks to the bottom of the vessel 1, whereby the magnetic field of the magnet 6 through the upper part of the frame 5 and the pole piece 11 is increased due to the metal piece or magnet 4, which shunts the air space 7. Thus the armature 8 attracted by the pole piece 11 will be operated and forced to leave the pole piece 12. In this manner the contact 9—10 is opened upon the sinking of the hydrometer and by means of the contact 9—10, interconnected in known way in indicating electric circuits, not shown in the drawings, a signal or the like may be easily obtained, indicating the lowering of the state of charge of the battery under the lowest allowable value.

As is obvious from the drawings the same result will be obtained if the level of the liquid 3 is lowered due to leakage or evaporation, the hydrometer may be used for the remote control of the level of the liquid at the same time.

In Figs. 3 and 4 is shown another form of the hydrometer according to this invention. The hydrometer proper 22 is here provided in a separate chamber 21, communicating with the vessel 20 containing the liquid by means of holes 24 and 25. Further on the hydrometer consists of a suitable plastic or synthetic resin in which the metal piece or permanent magnet 23 is moulded in known manner. For lead accumulators polymerised mono-vinyl-benzene is especially recommended for the hydrometer, because this material, also called polystyrol, trolitul, is indifferent with respect to the electrolyte and has a low specific gravity, so that the hydrometer may be made solid.

To guide the hydrometer within the chamber 21 and to hold it free from the walls of the same the hydrometer is provided with small protuberances 26.

The polarised relay, cooperating with the hydrometer, is here provided with a casing 27 and placed under the chamber 21 as shown in the Figs. 3 and 4. The relay is of substantially the same type as in Figs. 1 and 2, described above, but instead of only a break contact 9—10 this relay is provided with a break and make contact 28—29—30, operated by the movable armature. Of course any other contact combination or combinations may be provided.

The two forms described above have both the hydrometer proper within the vessel and the relay, cooperating with the same on the outside, which often may be advantageous. In Figs. 5–10 are shown hydrometers according to this invention, where also the armature, operable by means of the magnet of the hydrometer is provided within the vessel containing the liquid to be controlled. These forms are especially fit for lead accumulators, where the whole signaling hydrometer may be placed between two plates, as shown in Figs. 6 and 9.

The device, shown in Figs. 5 and 6, comprises a frame 40 within which the hydrometer 43 is movable up and down. The hydrometer is guided by means of protuberances 45 cooperating with guides 46. The frame 40 might be placed between two plates of an accumulator by means of stops 42. The hydrometer is provided with a magnet 44, cooperating with an iron armature 47, attached to a contact spring forming one part of the make contact 48. The armature is adjustable by means of a stud 49. The armature 47 and the contact means 48 are provided within the bottom of the frame 40 as shown in the figures and the electric conductors 41 interconnecting the contact means 48 in indicating circuits are provided within one side wall of the frame.

When the hydrometer 43 is lowered upon lowering specific gravity of the liquid to be controlled the magnetic field of the magnet 44 will operate the armature 47 causing the contact 48 to close, whereby a signal or the like may be obtained by means of indicating circuits connected to the wires 41 in any known manner not shown in the figures.

In order to make the maximum distance between the magnet 44 and the armature 47 independent of the upper level of the liquid to be controlled an edge 50 may be provided within the upper part of the frame 40, preventing the hydrometer from rising to the level of the controlled liquid. This is also of great importance because otherwise the surface tension of the liquid may prevent the hydrometer from sinking at the predetermined specific gravity. As is shown in the Figs. 5–10 the hydrometer may also be provided with holes 51, 81 to allow the controlled liquid to circulate, which is of importance in for instance storage batteries.

In Figs. 7 and 8 the hydrometer 63 is provided within a perforated shell or casing 60 instead of the frame 40, shown in Figs. 5 and 6. The hydrometer is provided with protuberances 65 and is prevented from raising to high in the controlled liquid by means of the edge at the top of the casing. The magnet 64 of the hydrometer cooperates with the iron armature 67 operating the make contact 68 as per above. A sleeve 61 is provided for the wires, connected to the contacts 68. As is easily understood, this signaling hydrometer works in the same way as the hydrometers described above.

The above described hydrometers are, as is obvious, particularly fit for storage batteries of the lead-acid type to give an alarm signal or to connect the battery to a charging current source, when the batteries have been discharged to the lowest allowable state of charge.

In Figs. 9–10 the signaling hydrometer is provided to give an electric indication upon the increase of the specific gravity of the liquid to be controlled. As in Figs. 5 and 6 the hydrometer is provided within a frame 70 and guided by means of protuberances 75 and guides 76. The magnet 74 is provided at the top of the hydrometer and cooperates with the armature 77, operating the contacts 78, provided at the top of the frame. The hydrometer is provided normally to be resting against the bottom of the frame 70 as shown in the Figs. 9 and 10 and to raise upon a certain increase of the specific gravity of the liquid to be controlled, causing the armature to operate as described above.

Of course the two forms, shown in Figs. 5 and 6 and 9 and 10 may be combined with each other, whereby indication can be obtained upon lowering as well as upon increase of the specific gravity by means of the same hydrometer.

The signaling hydrometer according to Figs. 9 and 10 is especially fit for arrangements for the automatic charge of a storage battery, where an interruption of the charge is wanted at a certain state of charge of the battery.

For the hydrometer proper as well as for the frames, casings and so on described above a suitable plastic or the like can be used and for the magnets an Al-Ni-Co alloy is especially recommended.

Although herein are shown and described only a few forms of apparatus embodying this invention it is easily understood that various changes and modifications may be made therein within the scope of the appended claims without departing from the spirit and scope of the invention.

Having thus described the invention, what is claimed is:

1. A control device comprising a hydrometer for measuring the gravity of a liquid, magnetic means disposed inside said hydrometer out of contact with said liquid, and a movable armature adapted to be operated by said magnetic means, and protective means interposed between said liquid and said armature to prevent contact between said liquid and said armature, whereby said magnetic means act through the wall of said hydrometer and said protective means to actuate said armature.

2. The device claimed in claim 1, in which the wall of said hydrometer and said protective means consist of non-magnetic material.

3. The device claimed in claim 1, in which the wall of said hydrometer and said protective means consist of glass.

4. A control device comprising a vessel containing a liquid whose specific gravity is to be controlled, a body floating in said liquid, said body forming a hydrometer, magnetic means secured to and surrounded by said body to protect said magnetic means from contact with said liquid, whereby said magnetic means is floatingly supported by said liquid and rise and fall in accordance with changes in the specific gravity of the liquid, a movable armature disposed outside said vessel at a predetermined point with respect to the normal position of said magnetic means, whereby, upon changes in the specific gravity of the liquid, and upon predetermined movement of said magnetic means said armature will be operated, whereby changes in the specific gravity of the liquid are automatically indicated.

5. The device claimed in claim 4, in which said body is a container in which said magnetic means is disposed.

6. The device claimed in claim 4, in which said body is a closed glass container in which said magnetic means is disposed.

7. The device claimed in claim 4, in which a U-shaped metallic support is provided on the outside of said vessel, and said armature is disposed between the legs of said support, the leg of said support adjacent said vessel consisting of two parts separated from each other by an air gap.

8. The device claimed in claim 4, in which a U-shaped metallic support is provided on the outside of said vessel, the one leg of said U-shaped support being disposed closer to said vessel than the second leg, said armature being disposed between the legs of said support, a magnet disposed between the legs of said support and serving to keep said armature in rest position, the first leg of said support consisting of two parts separated from each other by an air gap to interrupt the magnetic lines of force.

9. A control device, comprising a vessel containing a liquid whose specific gravity is to be controlled, a hydrometer floating in said liquid and adapted to rise and fall in accordance with changes in the specific gravity of the same, a first magnet secured to said hydrometer and adapted to float with the same, a movable armature disposed at a predetermined point with respect to said floating magnetic means, a second magnet operatively disposed with respect to said armature, whereby the same is held in a certain position, and circuit closing means associated with said armature, whereby, upon a predetermined movement of said floating first magnet with respect to said second magnet, the magnetic field of the latter is disturbed and said armature is moved to actuate said circuit closing means.

10. A control device adapted to be immersed in a liquid whose specific gravity is to be controlled, comprising a hydrometer, magnetic means disposed inside said hydrometer out of contact with said liquid, supporting means for said hydrometer, said supporting means comprising a compartment, a movable armature disposed in said compartment, said hydrometer being adapted to perform relative movements with respect to said supporting means within certain limits, whereby, upon changes in the specific gravity of said liquid, the said hydrometer will be displaced with respect to its supporting means and will operate said armature when approaching the same.

11. The device claimed in claim 10, in which said supporting means form a frame within which said hydrometer is movable, the latter consisting of a vessel provided with transverse channels to permit the liquid to pass through the same, said frame being further provided with suspending means for the purpose of suspending the device in a vessel containing the liquid to be controlled.

12. The device claimed in claim 10, in which said supporting means form a closed casing in which said hydrometer is movably disposed, said casing and hydrometer being provided with transverse channels to permit liquid to pass through the same.

13. The device claimed in claim 1, in which the wall of said hydrometer consists of polystyrol.

14. The device claimed in claim 4, in which a U-shaped metallic support is provided on the outside of said vessel, the one leg of said U-shaped support being disposed closer to said vessel than the second leg, said armature being disposed between the legs of said support, a magnet disposed between the legs of said support and serving to keep said armature in rest position, the first leg of said support consisting of two parts separated from each other by an air gap to interrupt the magnetic lines of force, a first pole piece carried by the section of the U-shaped support which is separated by said air gap from the rest of said U-shaped support, a second pole piece carried by the second leg of said U-shaped support, said armature extending between said two pole pieces, the latter serving to selectively attract said armature, whereby upon approach of said floatingly supported magnetic means to said U-shaped support, the magnetic lines of said magnetic means bridge said air gap causing the first pole piece to attract said armature.

15. The device claimed in claim 4, in which said magnetic means consists of a permanent magnet.

STEN DANIEL VIGREN.
NILS ERIK BERTIL STERNER.
GUNNAR EMANUEL EKSTRÖM.